(12) United States Patent
Moorhead

(10) Patent No.: US 7,727,310 B1
(45) Date of Patent: Jun. 1, 2010

(54) SYSTEM AND METHOD FOR REMOVING VOLATILE VAPORS FROM CONTAINERS

(75) Inventor: Elliott Moorhead, Watsonville, CA (US)

(73) Assignee: Nanovapor Fuels Group, Inc, Cypress, TX (US)

(*) Notice: Subject to any disclaimer, the term of this patent is extended or adjusted under 35 U.S.C. 154(b) by 274 days.

(21) Appl. No.: 11/959,416

(22) Filed: Dec. 18, 2007

Related U.S. Application Data

(60) Provisional application No. 60/871,766, filed on Dec. 22, 2006.

(51) Int. Cl.
*B01D 53/02* (2006.01)

(52) U.S. Cl. .............................. 95/146; 95/143; 96/243; 55/385.4

(58) Field of Classification Search .................... 95/143, 95/146; 96/243; 55/385.4
See application file for complete search history.

(56) References Cited

U.S. PATENT DOCUMENTS

| | | | | |
|---|---|---|---|---|
| 2,004,074 A | * | 6/1935 | Kiley | 220/749 |
| 3,830,074 A | * | 8/1974 | Nichols | 62/48.2 |
| 3,967,941 A | * | 7/1976 | Terao | 96/318 |
| 5,634,962 A | * | 6/1997 | Trahan et al. | 95/158 |
| 5,753,010 A | * | 5/1998 | Sircar et al. | 95/45 |
| 5,824,138 A | * | 10/1998 | Taylor, III | 95/288 |
| 5,897,690 A | * | 4/1999 | McGrew | 95/188 |
| 6,953,496 B2 | * | 10/2005 | Grantham et al. | 96/4 |
| 7,147,689 B1 | * | 12/2006 | Miller | 95/92 |
| 2003/0101868 A1 | * | 6/2003 | Muller | 95/216 |
| 2003/0131830 A1 | * | 7/2003 | Noble | 123/536 |

* cited by examiner

*Primary Examiner*—Robert J Hill, Jr.
*Assistant Examiner*—Christopher P Jones
(74) *Attorney, Agent, or Firm*—Mahamedi Paradice Kreisman LLP

(57) ABSTRACT

A system is configured to remove volatile organic compounds from a container. The system includes a vapor capture medium that is provided in a containment, and a particulatizer. The particulatizer is positioned to (i) receive volatile organic compounds that are removed from the container in a vapor flow, and (ii) introduce the volatile organic compounds into the vapor capture medium as micro-sized particles. The vapor capture medium is in liquid form and has a composition that is inherently attracted to bond with at least some of the volatile organic compounds that are removed from the container in the vapor flow, so that the vapor capture medium captures at least some of the micro-sized particles of volatile organic compounds that are introduced through the particulatizer.

14 Claims, 4 Drawing Sheets

SYSTEM AND METHOD FOR REMOVING VOLATILE VAPORS FROM CONTAINERS

RELATED APPLICATIONS

This application claims benefit of priority to Provisional U.S. Patent Application No. 60/871,766, filed Dec. 22, 2006, entitled DEGASSING SYSTEM AND TECHNIQUE; the aforementioned priority application being hereby incorporated by reference in its entirety.

BACKGROUND

The problem of removing volatile vapors has significance in many applications, including those that require transfer of fuel. When a fuel tank is emptied, vapor fuels can build up in the tank. In addition to being an inherent safety hazard, the vapors can interfere with fluid intake in refill operations. In order to empty tanks and containers of fuel vapors, conventional techniques sometimes seek to burn the vapor fuels. However, with emission control laws and regulations becoming more strict, the amount of vapor fuel that can be legally burned or flared has decreased.

Current conventional techniques for dealing with the buildup of volatile vapors provide for destructive solutions. Specific conventional approaches include oxidizing, flaring or burning the vapor contents of emptied tanks and containers. But these conventional approaches often have environmental consequences. Moreover, with increasing fuel costs, none of the vapors that are in emptied tanks are captured.

DETAILED DESCRIPTION

Figure 1:
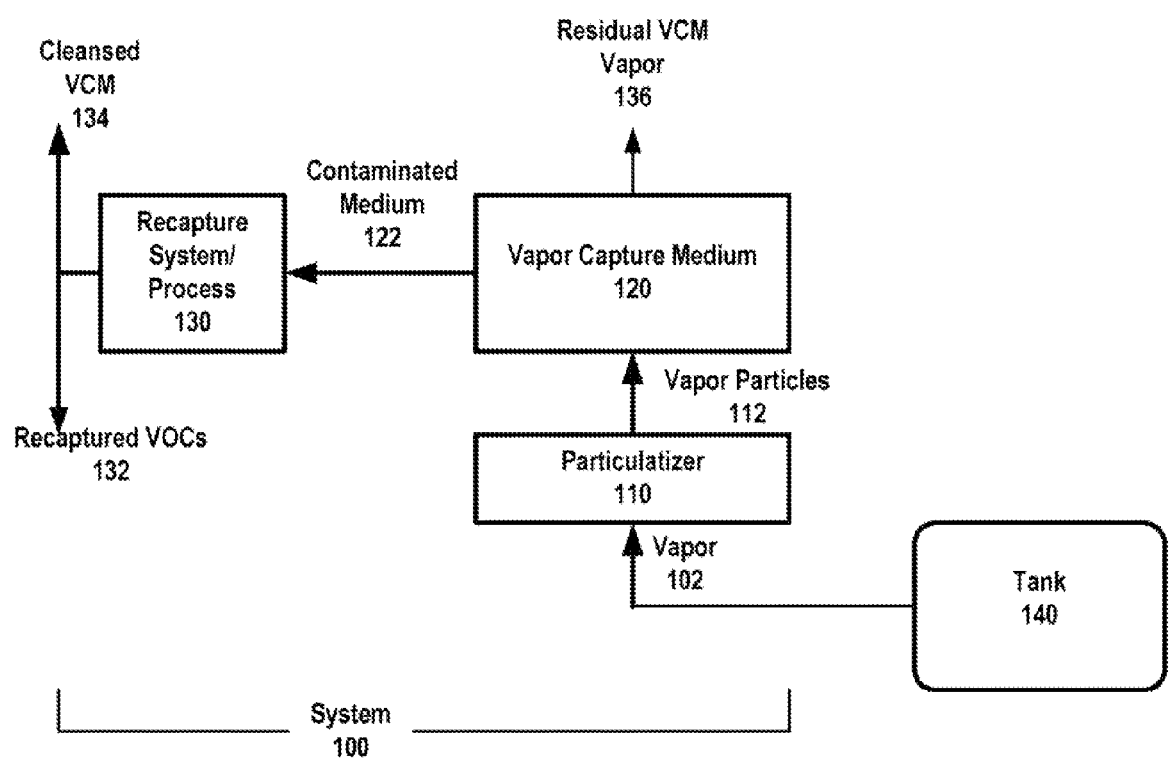
FIG. 1 illustrates a system for use in cleansing containers of volatile organic compounds, under an embodiment.

Embodiments described herein enable a system and method by which volatile organic compounds (VOCs) and other volatile vapors may be removed from various types of containers and tanks. Among other benefits, embodiments described herein enable a system or technique for cleansing or removing VOCs from emptied tanks and containers without need to flare, burn or oxidize the VOC vapors in the emptied tanks. Still further, embodiments described herein enable the VOCs within the emptied tanks to be captured and re-used. In fuel applications, for example, the recapture of fuel from vapors is conservative and cost-effective.

According to an embodiment, a system is configured to remove VOCs from a donative tank or container. The system includes a vapor capture medium, and a particulatizer that are provided in a separate containment. The particulatizer is positioned to (i) receive VOCs that are removed from the container in a vapor flow, and (ii) introduce the VOCs into the vapor capture medium as micro-sized particles. The vapor capture medium is in liquid form and has a composition that is inherently attracted to bond with at least some of the VOCs that are removed from the container in the vapor flow, so that the vapor capture medium captures at least some of the micro-sized particles of VOCs that are introduced through the particulatizer.

An embodiment provides that VOCs may be removed from a container by steps that include receiving a vapor flow from a container that is at least partially emptied to include VOC vapor. The VOCs in the vapor flow may be particulatized into micro-sized particles. The micro-sized particles may then be introduced into a vapor capture medium that is in liquid form. The vapor capture medium may have a composition that is inherently attracted to bond with at least some of the VOCs that are received in the vapor flow, so that the vapor capture medium captures at least some of the micro-sized particles.

In one embodiment, the introduction of the micro-size particles is done planarly, so as to span a plane of an interface of the vapor capture medium. More specifically, the micro-sized particles are introduced into the VCM across a planar interface that corresponds to an area that underlies the VCM.

Still further, an embodiment includes a fuel recapture system. The system includes an intake and a container that combine to receive a vapor flow of fuel from a donative container that is at least partially emptied. The container includes a chamber that initially receives the vapor flow, and a micro-porous layer that particulatizes the flow of fuel vapor into micro-sized particles. The container also includes a quantity of liquid that forms a vapor capture medium. The vapor capture medium is positioned to receive the particles from the micro-porous layer. Additionally the vapor capture medium includes a composition that is inherently attracted to bond with molecules of fuel vapor, so as to capture micro-sized particles of fuel vapor that comprise at least a portion of the particles particularized from the flow of fuel vapor.

The term "micro-size" or variations thereof refers to an upper limit in dimension of a particle. Generally, a "micro-size" particle means a particle that has a dimension that is less than 500 microns. However, as the term is intended to mean an upper-limit, micro-sized particles may also include particles that are smaller than the order of the micron (e.g. nano-scaled).

As used herein, the terms "particulatizer" or variations thereof (e.g. "particulatizing") mean something that performs the act of making particulate, including micro-size particles.

System Overview

FIG. 1 illustrates a system for use in cleansing containers of volatile organic compounds, under an embodiment. A system 100 may be implemented through a container, or series of containers, that is transportable or otherwise combinable on-site with a tank 140 or other storage unit containing VOCs. The tank 140 may be a container for use in holding fuel and other volatile substances for anyone of many applications. Accordingly, the tank 140 may have any one of many possible sizes and scale of operation. For example, the tank 140 may correspond to a fuel storage tank having a size or scale that ranges anywhere from hundreds of gallons to millions of gallons. One application for an embodiment such as described is to remove vapors or other fuels from large capacity tanks, such as 1-3 million gallon tanks. Other applications may include removing vapors from smaller tanks that hold thousands of gallons and are used at different sites for fueling equipment or vehicles. Still further, system 100 may be employed with a fuel tank or vacuum tank vehicle or ship tanker, or for the fuel tank of an aircraft. Numerous other applications for implementing embodiments such as described are contemplated, some of which are described elsewhere in this application.

System 100 may be coupled to a tank 140 containing volatile organic compounds (VOC) that need to be removed. Some examples of VOC vapors that may be handled with system 100, and other embodiments described herein, include vapors of gasoline, kerosene, crude fuel, butane, octane, Hexane, Pentane, LPG, LNG and other volatile fuels. Still further, embodiments described herein may alternatively be used to remove volatile chemical vapors such as alcohol, amines, ketones, benzenes, toluenes, xylene, and ethyl benzene.

If tank 140 is emptied or partially emptied, the presence of VOC vapors and residue creates a potential hazard. Moreover, the VOCs must be sufficiently removed from the tank 140 so as to not hinder the tank when being refilled. System 100 may be combined (i.e. as part of the same unit) or coupled (i.e. as part of a separate unit) to the tank 140 to enable the VOC vapors 140 to be sufficiently removed. The sufficiency of the removal may be set by pre-determined criteria, such as by government regulations or desired levels. Depending on the application, the container 140 may correspond to a large capacity fuel tank for servicing a population (e.g. such as found with refineries), a small storage fuel tank for servicing a particular site, or vehicle/shipping fuel tankers. In general, system 100 may be used to cleanse and optionally recapture VOCs that are in the form of fuel vapor from an empty or nearly empty container.

In contrast to conventional approaches that oxidize, burn, or flare the emptied or partially emptied tanks of VOCs, system 100, and other embodiments described herein, captures the VOCs in a non-destructive manner. Still further, the capture of the VOCs may be combined with a sub-system to enable isolation and reuse of the VOCs in liquid form.

According to an embodiment, a system 100 includes a particulatizer 110 and a vapor capture medium 120 (VCM). The particulatizer 110 receives the VOC vapor 102 and causes the VOC vapor 102 to particularize into micro-size particles 112. The micro-sized particles 112 may vary in range between 5-500 microns, although smaller and larger particles may also be used with embodiments described herein. For example, particles 112 of VOCs may be introduced into the VCM 120 that have a dimension that is of the order of 500-1000 or more microns. Likewise, even smaller dimensioned particles (e.g. "nano-scaled" particles such as 0.01-0.5 microns) may be created from the VOC vapor and introduced into the VCM 120.

In an embodiment, the VCM 120 is formulated or otherwise created to retain particles 112. To this end, the VCM 120 may be in liquid form and have a composition that is inherently attracted to bond with chemicals that comprise the VOC vapors 102. The particulatizer 110 may particulate the VOC vapors 102 to enhance or maximize the absorption amount that is possible from a given quantity of the VCM 120. In one embodiment, the VOC particles 112 have a largest dimension that is in range of 1-150 microns, although as mentioned above, the micro-sized particles 112 may be made to have smaller or larger dimensions to accommodate different flow rates.

In addition to particularizing the VOC vapor 102, the particulatizer 110 (with or without other components) also distribute the particles into the VCM 120. In one embodiment, the particulatizer 110 is provided in the form of a micro-porous pipe or containment that is inserted into or otherwise surrounded by the VCM 120. For example, a pipe or tubing may carry VOC vapor 102 and be made to include high-density, micro-porous walls or sections that serve to distribute the VOC particles 112 with pressure supplied from the tank 140 and/or other sources. Such a pipe may span the VCM 120 vertically and/or horizontally. For example, high-density pipes or tubing may be extended into the VCM 120, and/or traversed horizontally on the bottom of the containment of the VCM.

In an embodiment, however, the particulatizer 110 is constructed and positioned to planarly distributes the VOC particles 112 into the VCM 120. Specifically, the VOC particles 112 may be introduced into an area-interface with the VCM 120, so that the particles 112 are introduced substantially uniformly across a plane that defines the area. One or more embodiments recognize that such planar distribution enhances or maximizes the saturation of VCM 120 with VOC particles 112. For example, consistent with an embodiment shown by FIG. 3, the particulatizer 110 may be provided as a layer that is positioned underneath the VCM 120. The particulatizer 110 may use a combination of VOC vapor pressure and gravity to enable the VOC particles 112 to be planarly distributed into the VCM 120.

According to an embodiment, the VCM 120 has characteristics of being non-volatile, with the ability to capture and hold carbon compounds. In one embodiment, the VCM 120 has the capability of capturing and holding (on a molecular or particle level) elements of the source vapor. Additionally, the VCM 120 has the characteristic of being substantially or at least measurably separable from the source vapor particles 112.

In an embodiment, the VCM 120 is selected or formulated based on its capacity to retain the VOC particles 112. Under one embodiment, the VCM 120 may be selected to be a naturally derived, non-volatile oil with a composition that has an inherent affinity for carbon molecules in fuel or other volatile compounds. In particular, the attraction may be to inherently form covalent bonds with the carbon present in the VOCs. Accordingly, an embodiment provides that the VCM 120 is formulated or otherwise derived from tall fatty acids, such as botanically derived oils and/or animal fats. Specific examples of materials that may be used in the composition include soybean oil, palm oil, cotton seed oil, lemon oil, and/or lavender. One or more embodiments provide for the VCM 120 to be prepared or derived from a raw state.

While embodiments described above provide for use of botanically-derived oils, for example, other embodiments contemplate other formulations for VCM 120. In one embodiment, the VCM 120 may be derived or otherwise based on bio-diesel. Still further, other embodiments provide for use of a honeycomb solid structure that has some absorbency to retain and hold vapors, particularly from carbon-based volatile compounds.

An embodiment provides that the VCM 120 may be saturated with the VOC compounds present in the particles 112. Saturated (or contaminated) VCM 122 may be removed from the system 100. In one embodiment, the saturated VCM 122 may be cleansed and re-used through a recapture system or process 130. The recapture system or process 130 may correspond to a system or process that separates the VCM 120 from the VOC compounds present with particles 112. For example, a combination of chilling and heating may be used to separate VOC compounds from the particles 112 As an alternative, a centrifugal process may be used. Still further, another recapture process or system is illustrated with an embodiment of FIG. 4.

In an embodiment, recaptured VOCs 132 result from the recapture system 130 or process. The recaptured VOCs 132 may be re-used in liquid form. Thus, for example fuel vapors may be recaptured as liquid fuel and then re-used.

Additionally, cleansed VCM 134 may result from the re-captured process. The cleansed VCM 134 may be re-introduced into the system 100 for re-use as VCM 120. Under one implementation, the cleansed VCM 134 is sparged or cleansed further before re-use. In a passive system, the VCM 120 may be distilled and cleansed off-site. In an active system, valves and/or pipes may be used to re-circulate the cleansed VCM 134 back into the system. In particular, the re-circulation may occur while the VOC removal process is ongoing. Considerations for pressure balancing and other factors may be integrated into how valves that interconnect containers of cleansed VCM 134 feedback into the containment of VCM 120.

One or more embodiments anticipate that some VOC particles 112 pass through the VCM 120 without capture ("residue vapor 136"). In an embodiment, the composition and quantity of VCM 120 is selected so that the residue VOC vapor 136 is below a pre-determined or desired threshold (e.g. below government regulations). If the VCM 120 is held in containment, the residue VOC vapor 136 may be released or suctioned off elsewhere. As an alternative or addition, the VOC vapor 136 may be returned to the tank 140 for additional processing.

In one embodiment, the system 100 is coupled to the container 140 to create an active and closed system that neither releases nor destroys VOCs. In such an embodiment, the residue VOC vapor 136 is passed back into the tank 140. The residual VOC vapor 136 may be re-subjected to the process performed by system 100, resulting in additional capture of VOC particles 112.

Methodology

Figure 2:
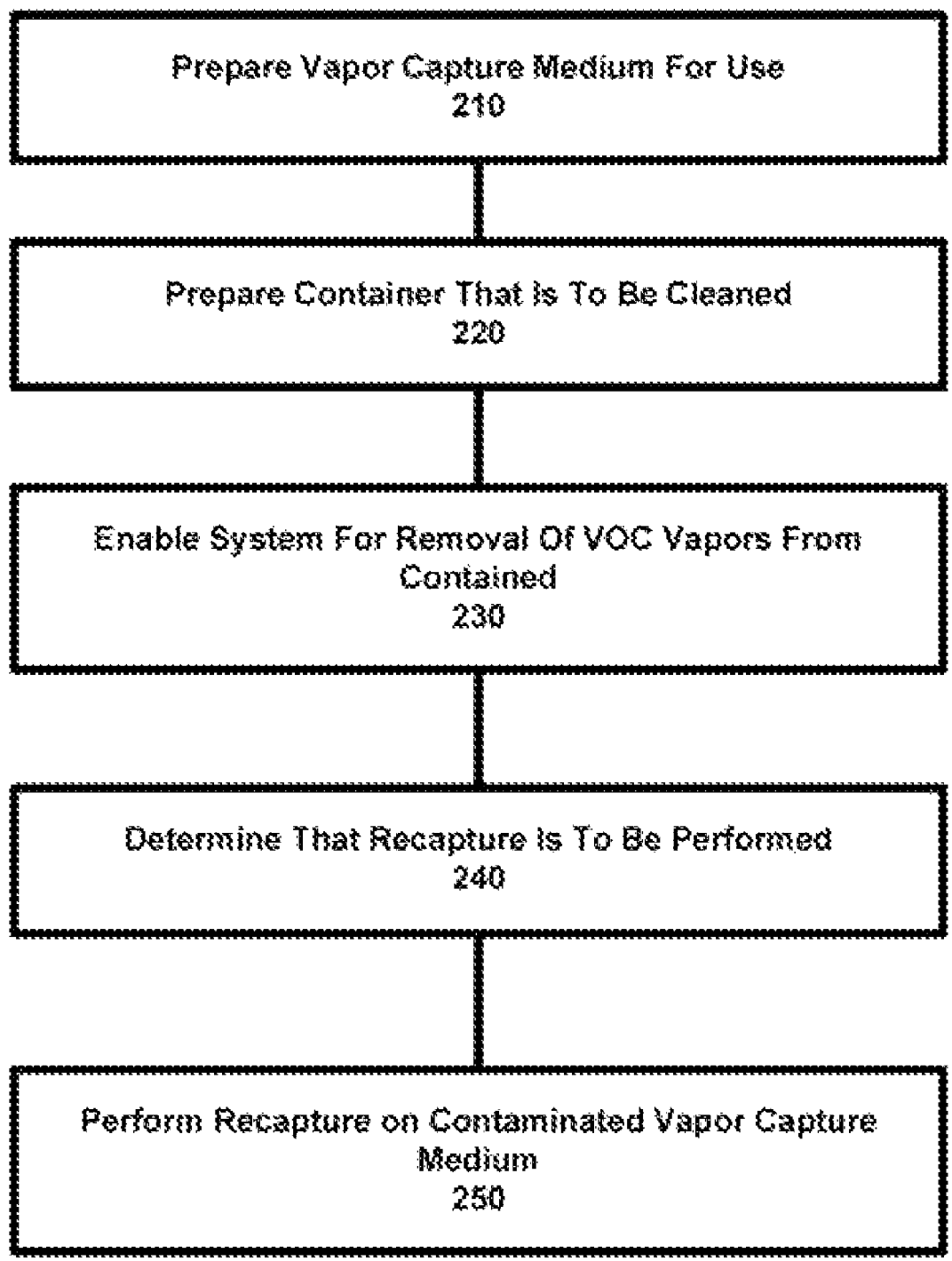
FIG. 2 illustrates a technique or methodology for removing VOC vapors from containers, under an embodiment of the invention.

FIG. 2 illustrates a technique or methodology for removing VOC vapors from containers, under an embodiment of the invention. In performing a method such as described, reference may be made to elements of system 100 for purpose of illustrating suitable components or elements for use in performance of a step or sub-step being described.

Step 210 provides that liquid VCM material is prepared for use. In one embodiment, the liquid VCM 120 may be a botanically-derived (or animal-derived) tall fatty-acid composition. Some processing may be performed on a raw oil to prepare it for use as VCM 120. In one implementation, a selected composition of botanically-derived oil is mixed with a natural biocide component such as lavender or lemon oil. Either component may provide the benefit of scenting the VCM 120. The mixture may be sparged, meaning air or air bubbles is finely introduced into the mixture. This may be accomplished by placing the oil/liquid mixture on pipes or ducts with microscopic porosity. Air may be run through the pipes so as to be introduced as small bubbles into the mixture. The sparging process may be enhanced by maintaining the temperature of the oil undergoing the process at about 80 degrees Fahrenheit, or thereabouts. Among other benefits, the sparging process results in cleansing or removal of naturally present volatile compounds.

Separately, under an embodiment, step 220 provides that the tank 140 is prepared for use. In one implementation, natural scent oils or agents may be introduced into the tank 140 in order to confirm withdrawal of VOCs when the system 100 is installed.

In step 230, the system 100 is enabled for operation with the tank 140. The intakes from system 100 may be connected to an appropriate VOC interface of the tank 140. In many applications, the VOC interface 140 may correspond to valves or pipes that are used to release VOCs from the tank. Depending on the application and the conditions present, the system 100 may receive a passive flow of vapor through the intake with the tank 140. The passive vapor flow may be an inherent result of introduction of fuel or liquid compounds into the tank. Alternatively, the passive vapor flow may result from a combination of the tank being heated by sunshine or other environmental conditions. In applications where the tank 140 is large, or conditions are not favorable for passive flow, turbines or other equipment may be used to draw the VOC vapor 102 out and into system 100.

According to an embodiment, step 240 provides that a determination is made that recapture is to be performed. This determination may be responsive to one or both conditions of (i) the tank 140 being sufficiently emptied of VOC vapors (as determined by some pre-determined threshold), or (ii) the VCM 120 of the system 100 being saturated. In one implementation, for example the VCM 120 is capable of holding up to 5-10% of its weight in VOC compounds through the introduction of VOC particles 112. Depending on the composition, the amount of VOC particles that can be handled may be even more than 10%. Thus, through measurement of weight of the VCM 120 or a container in which system 100 is implemented, a determination may be made as to whether recapture should be performed. Additionally, the levels of residue VOC vapors 136 may be measured to determine whether the VCM 120 is to be recaptured.

While embodiments contemplate that system 100 may cleanse tank 140 to adequate levels of VOC, one or more embodiments provide that recapture is performed before the tank 140 is sufficiently cleansed. Still further, recapture may also be performed each time cleansing is completed in order to reintroduce the VOC in liquid form to the tank 140.

Accordingly, an embodiment provides that the recapture process is performed in step 250. A system for performing a recapture process is described with an embodiment of FIG. 4, as well as elsewhere below. In embodiment, a result of the recapture process is one or both of (i) the captured VOC in liquid form, and/or (ii) sufficiently cleansed VCM 120 for re-use.

Container System

Figures 3A, 3B:
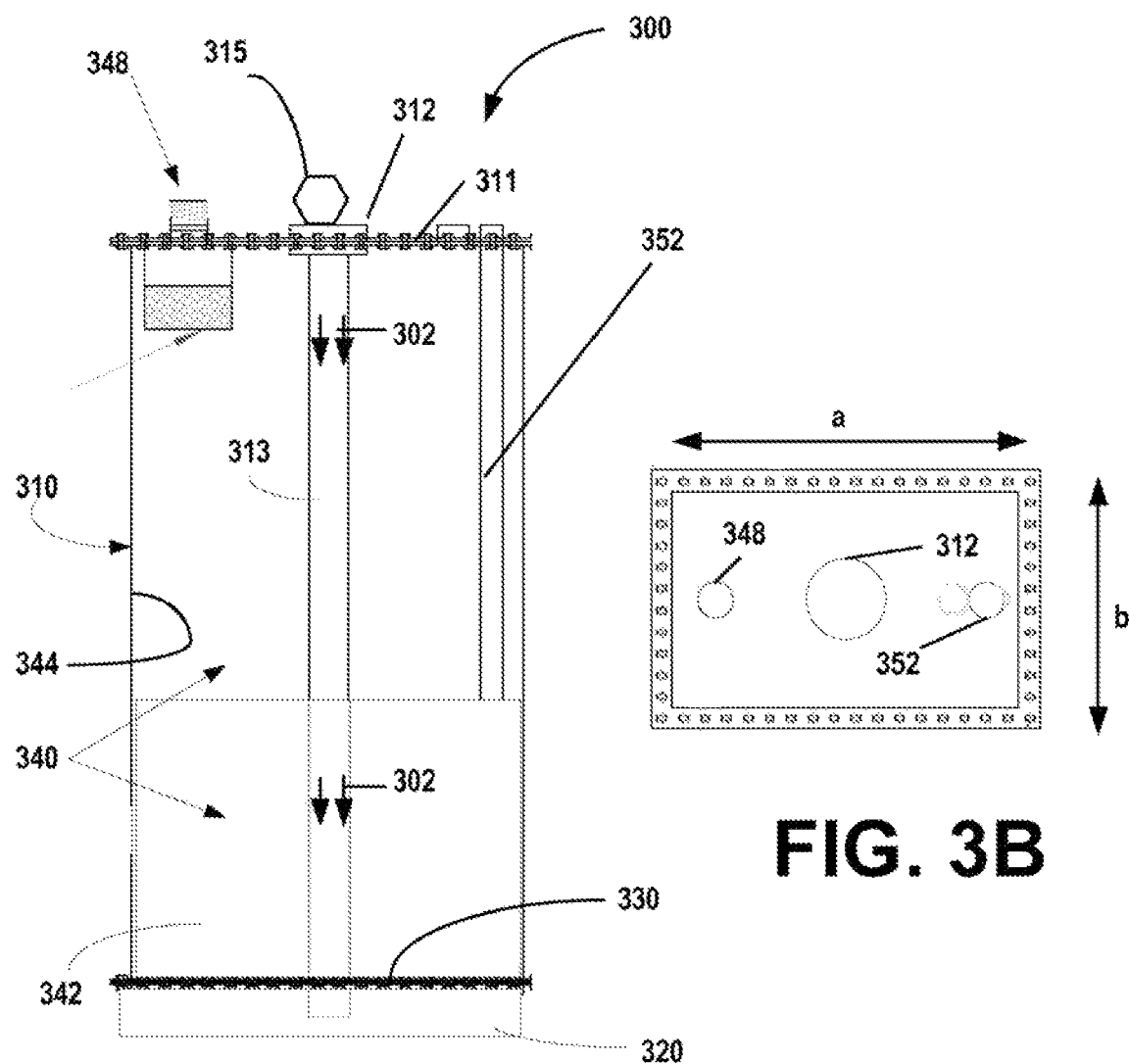
FIG. 3A is a side view of a container system 300 for use in removing VOC from tanks and containers, according to an embodiment.
FIG. 3B illustrates a top view of the container of system 300, under an embodiment.

FIG. 3A is a side view of a container system 300 for use in removing VOC from tanks and containers, according to an embodiment. The container system 300 is provided within a container housing 310 that includes a receiving containment 320, a micro-porous layer 330 (or other plenary layer), and a chamber 340 for holding a VCM 342 and residue space 344. An intake 312 may extend from a top end 311 of the container housing 310 and form a channel 313 which feeds into the receiving containment 320. The receiving containment 320 may be provided as an open space beneath both the micro-porous layer 330 and the chamber 340. This orientation enables the system 300 to benefit from gravity when the VOCs are introduced into the VCM 342. As mentioned with one or more other embodiments, the micro-porous layer 330 may be replaced or supplemented with high-density, micro-porous tubing or piping (extending vertically or horizontally).

The intake 312 may extend and connect to a tank or other container that is to be cleansed of VOC. In an embodiment, vapor flow 302 containing VOCs is fed through intake 312 and received in the receiving containment 320. Depending on the application, the vapor flow 302 may be driven by optional turbines or other drivers 315, so as to be an active intake. Alternatively, the vapor flow 302 may be generated passively, through, for example, changing conditions in the donative container. For example, in the case of storage containers, exposure to sun and heat may sufficiently increase the pressure of the container being cleansed to drive the vapor flow 302 through the intake 312 and into the receiving containment 320. In each case, the vapor flow 302 contains sufficient pressure to drive VOC compounds in the vapor from the receiving containment 320 through the micro-porous layer 330 and into the VCM 342.

Thus, in some applications, passive forces in the introduction of the vapor flow 302 provide sufficient pressure to drive the VOCs upward from the receiving containment 320 through the micro-porous layer 330, as described. In addition to increase in temperature (such as from sub exposure), passive forces for driving the vapor flow 302 may arise from the introduction of liquid compound into the donating tank.

The micro-porous layer 330 serves to particularize the vapor flow 302, while distributing particles arising from the vapor flow across a large area interface (i.e. the bottom boundary of the VCM 342) with the VCM 342. As such, the micro-porous layer 330 in the container housing 310 provides an implementation of particulatizer 110 (FIG. 1). According to an embodiment, the micro-porous layer 330 is formed from plastic or other molded material, such as ultra high molecular weight polyethylene (UHMW PE). The composition of the micro-porous layer 330 may also be chemically inert, at least to the VOCs that are introduced into the layer. The micro-porous layer 330 may be implemented through commercially available products typically used for functions such as diffusing, aerating and fluidizing materials. An example of a manufacturer of such products is GENPORE, a division of GENERAL POLYMERIC CORP. Sealants such as silicone may be used to seal the micro-porous layer 330 in place over the receiving containment 320. The plate(s) that comprise the micro-porous layer 330 may be sealed in place with standard RTV Silicones or the equivalent. In one implementation, the micro-porous layer 330 utilizes micro-dimensioned pores in the range of 10-125 microns. As an alternative implementation, a stainless steel plate that is laser drilled with micro-sized pores may also be used for the micro-porous layer 330.

As mentioned with other embodiments, much of the VOC particles that pass through the micro-porous layer 330 are captured in the liquid medium that is the VCM 342. Some VOC particles pass through the VCM 342 and occupy the space 344 of chamber 340. The VCM 342 may be designed and selected so that the concentration of such vapor residue in the space 344 is below some desired or required threshold (such as may be required by government regulations). An outlet 348 maybe used to collect and remove such VOC residue from space 344. A vacuum (not shown) or other driver may be used to pull the VOC particles (which should be at low concentration) out of the space 344. As described with an embodiment of FIG. 2, for example, the residue VOC vapor may be passed back into the donative container, so that the use of system 300 remains closed and non-destructive.

As the VCM 342 saturates with use, the captured VOC may separated and removed from the mixture in a separate process or sub-system. In one embodiment, the result of the recapture is that the VCM 342 is substantially restored to its original condition (so that it can be re-used) and the previously captured VOC in the mixture is in isolated liquid form. In the case of fuel, for example, the recapture of the VOC from the VCM 342 provides a cost-savings and is environmentally beneficial.

In an implementation, one or more drains 352 may be provided to drain the container housing 310 of the VCM 342. The VCM 342 may be drained when, for example, the VCM is saturated or when the VOC removal from the donative tank is sufficiently removed.

FIG. 3B illustrates a top view of the container of system 300, under an embodiment. The particular shape of the container may be circular or rectangular. The top side 311 of the container housing 310 may provide the entry for intake 312, and the outlet 348 by which the VOC residue is exited from the container housing.

As mentioned, an embodiment provides that the micro-porous layer 330 planarly introduces particles of VOC into the VCM 342. In an embodiment, the micro-porous layer 330 spans an internal area of the container housing 310, shown by dimensions a and b. In one embodiment, the particles are introduced into the VCM 342 substantially uniformly across the area (or portion thereof) defined by the dimensions, thereby illustrating a planar distribution of the particles into the VCM 342.

System with Recapture

FIG. 4 illustrates a system that removes or cleanses a fuel tank 410 or other storage unit of VOC vapors and then recaptures the VOC vapors in liquid form, according to an embodiment of the invention. The system 400 includes a capture phase 420, a separator 430, and a recapture container 440. The tank 410 may be partially or completely emptied to include fuel or other volatile chemicals such as described with an embodiment of FIG. 1. Depending on the application, either an active or passive connection 418 may be used to interconnect the tank 410 with the capture phase 420. The capture phase 420 may include a container or arrangement of containments that receive VOC vapor from the tank 410.

Accordingly, the capture phase 420 may include a VCM mixture 422 such as described with any of the embodiments provided above. In one implementation, for example, the capture phase 420 may correspond to the system 300 described with an embodiment of FIG. 3. Thus, the VOC vapor may be particularized and combined with the VCM 422 to create the VCM mixture 424 that is removed from the capture phase 420.

Upon sufficient removal of VOC compounds from tank 410, or alternatively on saturation of the VCM mixture 424 with VOC compounds, the VCM mixture is removed from the containment of the capture phase 420. A pump 432 or other driver may be used to remove VCM mixture 424 from the containment and to drive the fluid mixture into the separator 430.

At the separator 430, an embodiment provides that high pressure nozzles 426 spray the liquid VCM mixture 424 into a container 444 or other space that comprise the separator 430. The nozzles 426 may create small droplets (e.g. 5-10 microns) of the VCM mixture 424. When outputted by nozzles 426, the VCM mixture 424 is separated from the fuel particles, and gravity directs the VCM 422 portion of the mixture 424 downward to settle at the bottom. A light vacuum may be used to draw out the fuel vapor from the separator 430.

At the same time, the fuel vapor portion 436 of VCM mixture 424 may be directed to the recovery tank 440, where it is collected in liquid form. Through use of the capture phase 420, the introduction of the VCM mixture 424 into the separator 430 may be regulated, so that a resulting fuel vapor concentration formed in the separator 430 has a steady concentration level range of fuel vapor. Nozzles 426 may be positioned so that the vapor portion of the VCM mixture 424 that is introduced into the separator 430 is provided in vicinity of a pump or light vacuum mechanism that draws out the fuel vapor into the recovery tank 440. In order to maintain the fuel vapor concentration level at a desired range, one or more embodiments provide that an intake of the separator 430 is balanced to match the outtake of fuel vapor in the recovery tank 440. In this way, the concentration of the fuel vapor in the separator 430 remains relatively constant, or at least within a desired range.

In one embodiment, fuel vapor may be drawn out of the separator 430 at a relatively constant flow. Fuel vapor from the separator 430 may be subjected to a stage 432 in which chilling, vacuum, and/or high pressure takes place, to enhance condensation of the droplets of fuel vapors.

Upon completion, the recovery tank 440 contains fuel 436 from the extracted fuel vapors. The separator 430 includes VCM introduced at the capture phase 420. The recovery tank 440 may or may not be on-site where the system operates. Still further, the recovery tank 440 may optionally be included with the separator 430.

As another alternative, this recaptured VCM 422 may be re-introduced into the capture phase 420 via tubing/pipe connection 437. In one implementation, the system re-circulates the VCM 422 back into the capture phase 420 when the system employs drivers or other mechanisms to draw VOCs from the fuel tank 410. This enables a closed and active system.

Figure 4:
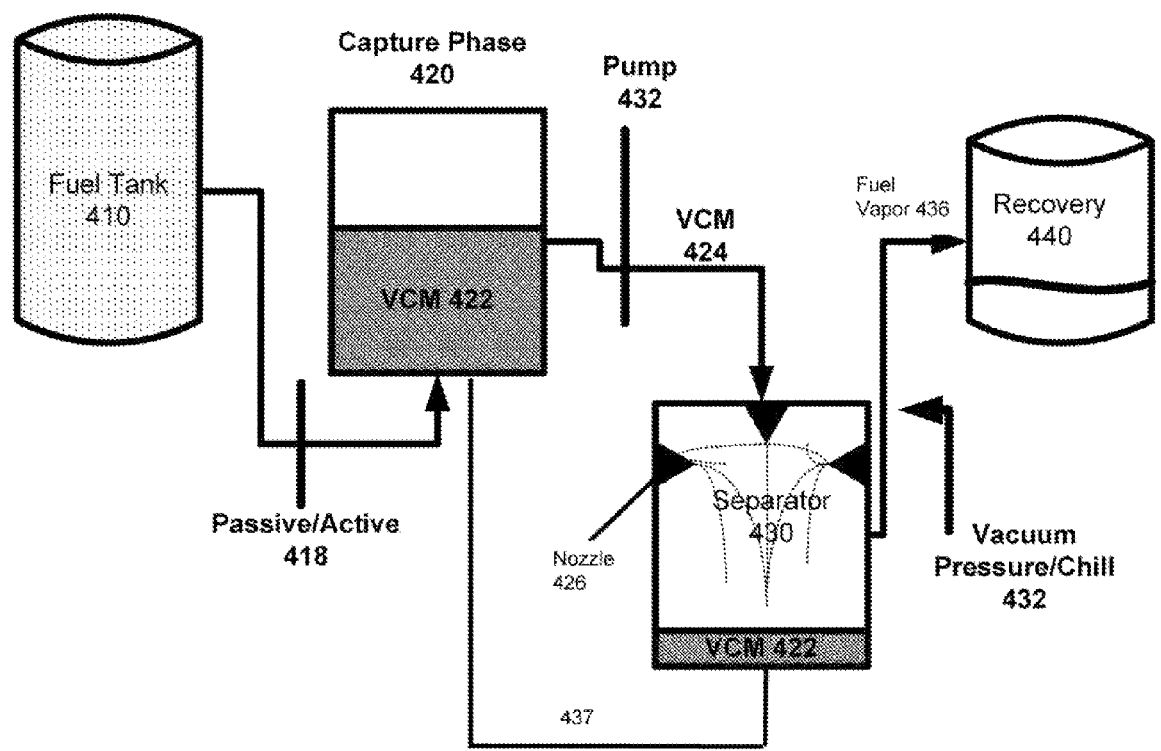
FIG. 4 illustrates a system that removes or cleanses a fuel tank or other storage unit of volatile organic compounds and then recaptures the VOC vapors in liquid form, according to an embodiment of the invention.

Under another embodiment, however, the system shown in FIG. 4 may be completely passive, meaning no drivers or moving parts are used. Rather, pressure derived from naturally occurring conditions or other events may be used to push VOCs from the fuel tank 410 into the capture phase 420 and beyond. To maintain the system completely passive, an implementation provides that the re-circulation of VCM 422, and/or cleansing recovery for its reuse in the process being described, occurs off-site. However, such a passive system may not be closed, as would be the case with the active implementation.

Numerous other capture techniques and systems may be used with an embodiment described. For example, as an alternative to the use of separator 430 and recovery tank 440, commercially available systems may be used.

Applications

Any of the embodiments described above may be employed with refinery or large fuel tanks that can hold hundreds of thousands, or millions of gallons of fuel when full. With reference to an embodiment of FIG. 1, for example, system 100 may be used in combination with turbines or other active mechanism to withdraw fuel vapors from a fuel tank. In many cases, the concentration of extracted fuel vapor fluctuates too greatly to be captured with conventional recapture mechanisms. In contrast, an embodiment such as described with FIG. 1 accommodates the VOC vapor capture outside of the fuel tank, even when the VOC concentration fluctuates greatly. Many current systems burn off source vapor rather than recapture it, in part because of the expense and difficulties in recapturing, oxidizing or burning fuel vapor which has a concentration that ranges from being fuel-rich to being fuel-poor. In contrast, an embodiment such as described provides for the capture of the VOC vapors outside of the tank, so as to avoid flaring or burning of the VOC compounds that is typically performed under conventional approaches.

Still further, other embodiments may be implemented as or on a portable medium, such as on the back of a flatbed truck or trailer hitch. When made portable, a container system such as described with an embodiment of FIG. 3 may be transported to the site where donative tank(s) that are to be cleansed are located. For refinery implementations, larger container systems may be transported using large vehicles.

In an embodiment, recapture of VOC in liquid form may be performed either on-site or off-site. When performed on-site, the recaptured fuel or VOCs may be returned to the operator of the tank being cleansed. In some applications, recaptured VOCs may be sold or used as feedstock.

In another embodiment, a system such as described with FIG. 3 or FIG. 4 may be integrated or included with vehicle tankers for fuel and/or other VOCs. In one implementation, a section of a fuel tanker vehicle may be separated and structured to include, for example, an embodiment such as shown with FIG. 3 or FIG. 4. Other applications that may incorporate one or more embodiments described herein include vacuum trucks and devices that are used control removal of volatile compounds which may be in liquid, solid or vapor form.

As mentioned above, applications for use with embodiments described herein include cleansing VOC vapors from refineries and large scale tanks, battery tanks for oil drilling operations, storage tanks for industrial tanks, fuel trucks, marine applications, and airplane fuel bays.

With regard to marine applications in particular, one or more embodiments contemplate ship-to-ship and ship-to-shore transfers, such as described in the priority Provisional U.S. Patent Application No. 60/871,766. Embodiments described herein include a technique or process for treating vapor growth in ship-to-ship or ship-to-shore transfers of petroleum related compounds. One or more embodiments recognize the transfer of petroleum compounds causes vapor growth in the receiving vessel that must be balanced currently by recovering the vapor back to the parent or donating ship. As mentioned with other embodiments, vapor release to atmosphere is a regulated event costing large sums in the case of violation of air quality regulations. Dealing with vapor growth is expensive to the carrier as the time required for transfer is controlled by the ability to recover the vapors generated in transfer conditions. One or more embodiments include an ability to control and suppress the vapor growth in this type of transfer on either ship, using any of the aforementioned embodiments of FIG. 1-4.

Still further, one or more embodiments may align systems such as shown with FIG. 3 or FIG. 4 in series. In particular, passive variations to an embodiment of FIG. 3 may be arranged in series to achieve a very low-emission result.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A system for removing volatile organic compounds from a container, the system comprising: a containment that includes a vapor capture medium; a particulatizer that is positioned to (i) receive volatile organic compounds that are removed from the container in a vapor flow, and (ii) introduce the volatile organic compounds into the vapor capture medium as micro-sized particles; wherein the particulatizer includes a layer of micro-porous material; wherein the vapor capture medium is in liquid form and has a composition that is inherently attracted to bond with at least some of the volatile organic compounds that are removed from the container in the vapor flow, so that the vapor capture medium captures at least some of the micro-sized particles of volatile organic compounds that are introduced through the particulatizer.

2. The system of claim 1, wherein the particulatizer is configured to planarly distribute the micro-sized particles across an interface of the vapor capture medium.

3. The system of claim 1, further comprising: a receiving containment that receives the vapor flow from the container; wherein the layer of micro-porous material is provided between the receiving containment and the containment of the vapor capture medium, wherein the layer of micro-porous material is positioned and configured to enable the flow of vapor to be introduced into the vapor capture medium as micro-sized particles.

4. The system of claim 3, wherein the layer of micro-porous material is formed from a porous layer of plastic or steel.

5. The system of claim 3, further comprising an intake that is connected to the receiving containment and the container to passively receive the vapor flow.

6. The system of claim 3, further comprising: an intake that is connected to the receiving containment and the container; one or more drivers that drive the flow of vapor from the container to the receiving containment.

7. The system of claim 1, wherein the system further comprises a recapture system that removes and collects captured molecules of volatile organic compounds from the vapor capture medium.

8. The system of claim 1, wherein the vapor capture medium comprises an oil that is derived from a botanical or animal source.

9. The system of claim 1, wherein the system is mobile and capable of operating at a site of container.

10. The system of claim 1, wherein the system is provided with or as part of a fuel tank vehicle.

11. A fuel recapture system comprising: an intake that is coupleable to a donative container containing fuel vapor; a container that is structured to receive a vapor flow of fuel from the donative container using the intake; wherein the container includes: a containment that initially receives the vapor flow; one or more diffusion plates that receive the flow of fuel vapor; a quantity of vapor capture medium in liquid provided with the one or more diffusion plates to receive the fuel vapor; the vapor capture medium having a composition that is inherently attracted to bond with molecules of fuel vapor, so as to capture micro-sized particles of fuel vapor that comprise at least a portion of the flow of fuel vapor; wherein the quantity of vapor capture medium is derived from an oil comprising tall fatty acids.

12. The fuel recapture system of claim 11, wherein the one or more diffusion plates include a micro-porous layer.

13. The fuel recapture system of claim 12, wherein the quantity of vapor capture medium is positioned over the micro-porous layer, and wherein the micro-porous layer is positioned over the container.

14. The fuel recapture system of claim 13, further comprising a recapture sub-system that separates the captured micro-sized particles of fuel vapor from the vapor capture medium.

* * * * *